(12) United States Patent
Nemiroff

(10) Patent No.: US 10,341,099 B2
(45) Date of Patent: *Jul. 2, 2019

(54) CRYPTOGRAPHIC KEY GENERATION USING A STORED INPUT VALUE AND A STORED COUNT VALUE

(71) Applicant: Intel Corporation, Santa Clara, CA (US)

(72) Inventor: Daniel Nemiroff, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 15/052,173

(22) Filed: Feb. 24, 2016

(65) Prior Publication Data
US 2016/0197724 A1    Jul. 7, 2016

Related U.S. Application Data

(63) Continuation of application No. 14/636,717, filed on Mar. 3, 2015, which is a continuation of application No. 12/456,909, filed on Jun. 24, 2009, now Pat. No. 8,971,530.

(51) Int. Cl.
| | |
|---|---|
| *H04L 9/08* | (2006.01) |
| *H04L 9/06* | (2006.01) |
| *H04L 9/32* | (2006.01) |
| *G06F 7/58* | (2006.01) |

(52) U.S. Cl.
CPC .......... *H04L 9/0869* (2013.01); *G06F 7/582* (2013.01); *H04L 9/0662* (2013.01); *H04L 9/0861* (2013.01); *H04L 9/3249* (2013.01); *G06F 7/588* (2013.01); *H04L 2209/24* (2013.01); *H04L 2209/72* (2013.01)

(58) Field of Classification Search
None
See application file for complete search history.

(56) References Cited

U.S. PATENT DOCUMENTS

| | | | | |
|---|---|---|---|---|
| 5,850,450 A | * | 12/1998 | Schweitzer | ............ G06F 7/588 |
| | | | | 380/30 |
| 5,864,667 A | | 1/1999 | Barkan | |
| 6,185,682 B1 | | 2/2001 | Tang | |

(Continued)

FOREIGN PATENT DOCUMENTS

| | | |
|---|---|---|
| CN | 1836220 | 9/2006 |
| CN | 1964257 | 5/2007 |

(Continued)

OTHER PUBLICATIONS

Lim, et al., "A Study on the Proposed Korean Digital Signature Algorithm", 2000, Springer-Verlag Hedelberg, 175-186.

(Continued)

*Primary Examiner* — Trang T Doan
(74) *Attorney, Agent, or Firm* — Trop, Pruner & Hu, P.C.

(57) ABSTRACT

Embodiments of an invention for cryptographic key generation using a stored input value and a stored count value have been described. In one embodiment, a processor includes non-volatile storage storing an input value and a count value, and logic to generate a cryptographic key based on the stored input value and the stored count value.

20 Claims, 6 Drawing Sheets

(56) References Cited

U.S. PATENT DOCUMENTS

| | | | |
|---|---|---|---|
| 6,393,447 | B1 | 5/2002 | Jakobsson |
| 6,714,955 | B2 | 3/2004 | Le Quere |
| 7,050,584 | B1* | 5/2006 | Hoffmann ............... H04L 9/302 380/262 |
| 7,424,115 | B2 | 9/2008 | Hyyppa et al. |
| 7,921,455 | B2 | 4/2011 | Lin et al. |
| 8,290,150 | B2* | 10/2012 | Erhart .................... H04L 9/302 380/44 |
| 2002/0141575 | A1* | 10/2002 | Hird ........................ G06F 21/62 380/44 |
| 2002/0186837 | A1* | 12/2002 | Hopkins ................... G06F 7/72 380/28 |
| 2003/0158960 | A1 | 8/2003 | Engberg |
| 2004/0151317 | A1 | 8/2004 | Hyyppa et al. |
| 2004/0267844 | A1 | 12/2004 | Harding |
| 2005/0021986 | A1 | 1/2005 | Graunke et al. |
| 2006/0126843 | A1 | 6/2006 | Brickell et al. |
| 2006/0136717 | A1* | 6/2006 | Buer ..................... H04L 9/3234 713/155 |
| 2007/0106896 | A1 | 5/2007 | Sandberg et al. |
| 2007/0121934 | A1* | 5/2007 | Futa ......................... G06F 7/72 380/28 |
| 2007/0130472 | A1 | 6/2007 | Buer et al. |
| 2008/0232595 | A1 | 9/2008 | Pietrowicz et al. |
| 2009/0164784 | A1* | 6/2009 | Klassen ............... G06Q 20/347 713/168 |
| 2011/0002461 | A1* | 1/2011 | Erhart .................... H04L 9/302 380/44 |
| 2014/0294174 | A1* | 10/2014 | Pulkus .................. H04L 9/0869 380/28 |

FOREIGN PATENT DOCUMENTS

| | | |
|---|---|---|
| CN | 101073220 | 11/2007 |
| EP | 0758816 A1 | 1/1997 |
| JP | 7-193565 A | 7/1995 |
| JP | 11-39437 A | 2/1999 |
| JP | 2001-94548 A | 4/2001 |
| JP | 2001-109375 A | 4/2001 |
| JP | 2004-248330 A | 9/2004 |
| JP | 2005-202757 A | 7/2005 |
| JP | 2006-317802 A | 11/2006 |
| KR | 10-2007-0108186 A | 11/2007 |
| WO | 2007/020564 A2 | 2/2007 |
| WO | 2008/104482 A2 | 9/2008 |
| WO | 2008/104482 A3 | 11/2008 |
| WO | 2008/104482 A4 | 1/2009 |

OTHER PUBLICATIONS

United States Patent and Trademark Office, Final Office Action dated Mar. 30, 2016 in U.S. Appl. No. 14/636,717.

Suh et al. "Physical Unclonable Functions for Device Authentication and Secret Key Generation", Published in DAC'07, Proceeding of the 44th Annual Design Automation Conference, Jun. 4-8, 2007, pp. 9-14.

Menezes et al., "Chapter 4: Public-Key Parameters", Handbook of Applied Cryptography, XP001525004, CRC Press, 1996, 38 Pages.

Search Report received for European Patent Application No. 10251007.0, dated Sep. 30, 2010, 5 Pages.

Office Action received for Korean Patent Application No. 10-2010-80036, dated Oct. 25, 2011, 4 pages of English Translation and 5 pages of Korean Office Action.

Office Action received for Japanese Patent Application No. 2010-092556, dated Aug. 7, 2012, 2 pages of English Translation and 2 pages of Japanese Office Action.

United States Patent and Trademark Office, Non-Final Office Action dated Sep. 30, 2016 in U.S. Appl. No. 14/636,717.

United States Patent and Trademark Office, Final Office Action dated Apr. 13, 2017 and Reply filed Jun. 9, 2017 in U.S. Appl. No. 14/636,717.

State Intellectual Property Office of the People's Republic of China, First Office Action dated Feb. 6, 2018, in Chinese Patent Application No. 201510781646.2.

State Intellectual Property Office of the People's Republic of China, Second Office Action dated Sep. 12, 2018 in Chinese Patent Application No. 201510781646.2.

* cited by examiner

CRYPTOGRAPHIC KEY GENERATION USING A STORED INPUT VALUE AND A STORED COUNT VALUE

This application is a continuation of U.S. patent application Ser. No. 14/636,717, filed Mar. 3, 2015, which is a continuation of U.S. patent application Ser. No. 12/456,909, filed Jun. 24, 2009, now U.S. Pat. No. 8,971,530, issued Mar. 3, 2015, the content of which is hereby incorporated by reference.

BACKGROUND

1. Field

The present disclosure pertains to the field of information processing, and more particularly, to the field of encrypting information.

2. Description of Related Art

In an information processing system, secret information may be protected from discovery by encrypting it. Encryption algorithms typically use one or more cryptographic keys to transform unencrypted information ("plain-text") into encrypted information ("cipher-text") that generally has no meaning unless subsequently decrypted by a reverse transformation using one or more of the cryptographic keys.

For example, the public key encryption algorithm developed by Rivest, Shamir, and Adelman ("RSA") uses two keys, one a public key and the other a private key. The public key may be made publicly available for encrypting information, and the private key is kept secret to be used to decrypt information encrypted with the corresponding public key. Both keys are derived from a pair of prime numbers.

BRIEF DESCRIPTION OF THE FIGURES

The present invention is illustrated by way of example and not limitation in the accompanying figures.

DETAILED DESCRIPTION

Embodiments of an invention for cryptographic key generation using a stored input value and a stored count value are described. In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

Elements of embodiments of the invention may be implemented in hardware, software, firmware, or any combination of hardware, software, or firmware. The term hardware generally refers to an element having a physical structure such as electronic, electromagnetic, optical, electro-optical, mechanical, electro-mechanical parts, etc. The term software generally refers to a logical structure, a method, a procedure, a program, a routine, a process, an algorithm, a formula, an expression, etc. The term firmware generally refers to a logical structure, a method, a procedure, a program, a routine, a process, an algorithm, a formula, or an expression that is implemented or embodied in a hardware structure (e.g., flash memory or read only memory). Examples of firmware are microcode, writable control store, micro-programmed structure, and a processor abstraction layer.

As described in the background section, information processing systems may use one or more cryptographic keys to encrypt and decrypt information. It may be desirable to store these key(s) in non-volatile storage within or otherwise accessible to an information processing system, so that the same key(s) may be used by the same system before and after the system is powered off. However, different systems may use different keys, and it may not be economically feasible to fabricate (e.g., using photomask technology) individual components for different systems differently. Information unique to different systems may be stored using semiconductor fuse or electrical programming technology, but storage for large keys (e.g., a 2048-bit RSA key pair) may significantly increase the cost per system. Therefore, it may be desirable for an information processing system to have the capability to re-generate one or more unique cryptographic keys. Embodiments of the present invention may be used to provide that capability.

Figure 1:
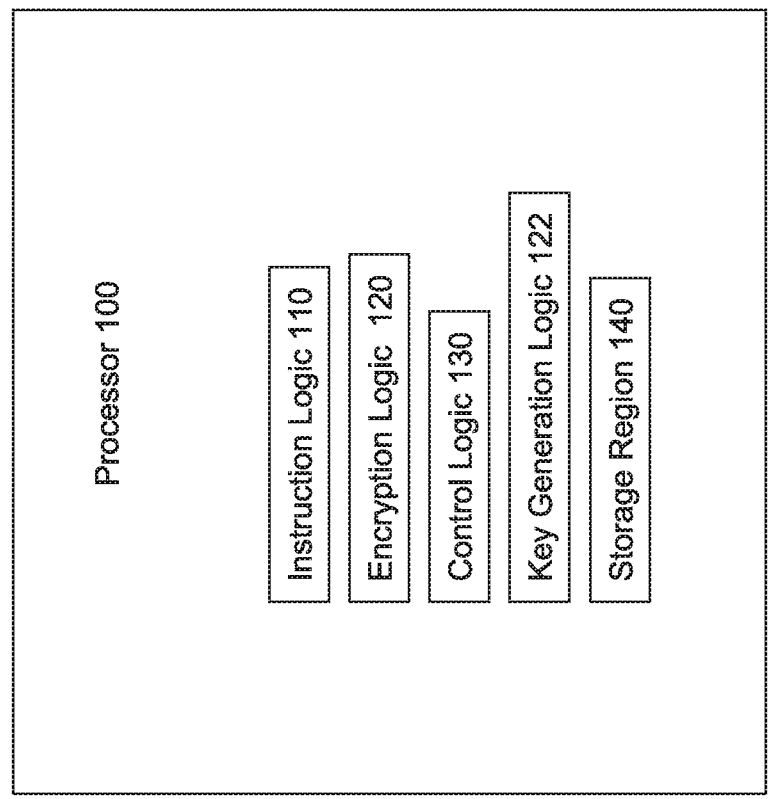
FIG. 1 illustrates a processor to generate a cryptographic key according to an embodiment of the present invention.

FIG. 1 illustrates processor 100 according to an embodiment of the present invention. Processor 100 may be any type of processor, including a general purpose microprocessor, such as a processor in the Intel® Pentium® Processor Family, Itanium® Processor Family, or other processor family from Intel® Corporation, or another processor from another company, or a special purpose processor or microcontroller. Processor 100 may include multiple threads and multiple execution cores, in any combination. Processor 100 includes instruction logic 110, execution logic 120, control logic 130, and storage region 140. Processor 100 may also include any other circuitry, structures, or logic not shown in FIG. 1.

Instruction logic 110 is to receive instructions. One or more of these instructions may be an instruction to encrypt or decrypt information according to any known encryption algorithm, or an instruction in a series of instructions that may be used to encrypt or decrypt information according to any known encryption algorithm. Instruction logic 110 may include any circuitry, logic, or other structure that recognizes, decodes, or otherwise receives these instructions. Instruction logic 110 may also receive any other instructions not described in this specification. In one embodiment, instruction logic 110 may include decode logic to decode instructions.

Execution logic 120 is to perform an encryption algorithm, a decryption algorithm, and/or any subset of operations used in an encryption algorithm, in response to instruction logic 110 receiving one or more instructions to encrypt or decrypt information. Execution logic 120 may include any circuitry, logic, or other structures to execute the encryption algorithm, such as any number of arithmetic logic units, shifters, and other structures. All or a portion of execution logic 120 may be dedicated to encryption according to a single standard or algorithm, or may be used, in whole, in part, and/or together with other logic, to support encryption according to more than one standard or algorithm, and/or to support decryption according to any of these algorithms, and/or may also be used for other operations. Execution logic 120 may also include any circuitry, logic, or other structures for executing instructions other than those used by encryption algorithms.

In one embodiment, execution logic 120 may include all or part of key generation logic 122. In other embodiments, all or part of key generation logic 122 may be included in separate logic outside of execution logic 120. Key generation logic 122 may include any circuitry, logic, or other structures to generate one or more cryptographic keys. Different embodiments of key generation logic 122 are shown in FIGS. 2 and 3.

Control logic 130 is to cause execution logic 120 to execute instructions, and/or cause key generation logic 122 to generate one or more cryptographic keys. Control logic 130 may include any circuitry, logic, or other structures, including microcode, state machine logic, programmable logic, or any other form of control logic, which may provide control signals to execution logic 120 based on instructions received by instruction unit 110. Control logic 130 may also cause any other circuitry, logic, or other structures in processor 100 to perform any other operation not entirely executed within execution logic 120. For example, control logic 130 may cause processor 100 to fetch stored input values and stored count values to be used in embodiments of the present invention, as described below. The stored input values and stored count values may be stored in and fetched from any storage region within or accessible to processor 100.

For example, the stored input values and stored count values may be fetched from storage region 140 within processor 100 in one embodiment. Storage region 140 may be a storage region of any type of memory or storage elements within processor 100. In one embodiment, storage region 140 may be non-volatile. For example, storage region 140 may be a programmable read-only memory implemented in semiconductor fuse technology. In one embodiment, storage region 140 may be secure, private, or protected, for example, accessible only by logic within execution logic 120 and/or key generation logic 122 based on control signals provided by control logic 130 upon the receipt of an encryption, decryption, or key generation instruction by instruction logic 110.

Figure 2:
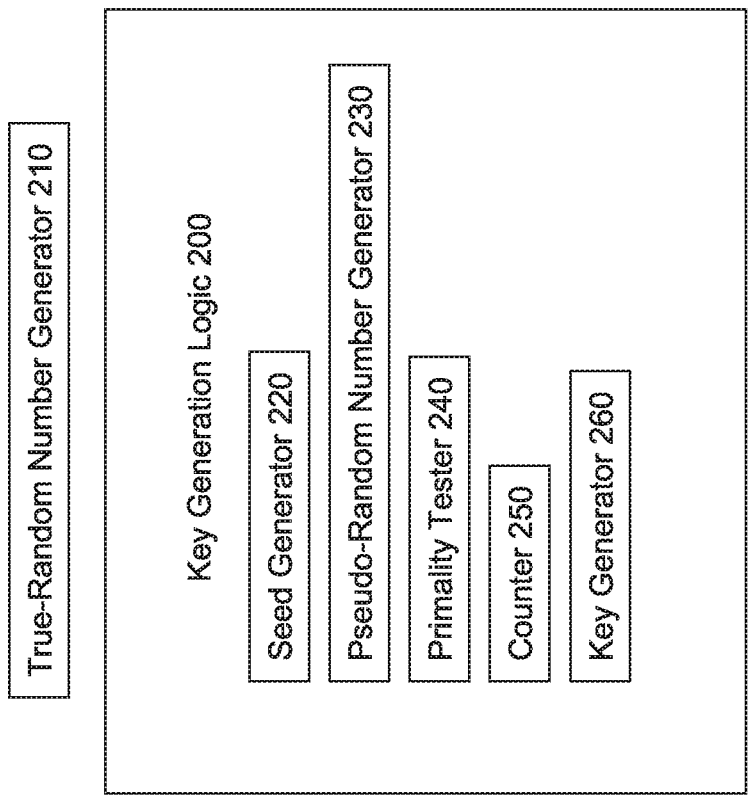
FIG. 2 illustrates logic to store an input value and a count value according to an embodiment of the present invention.
Figure 3:
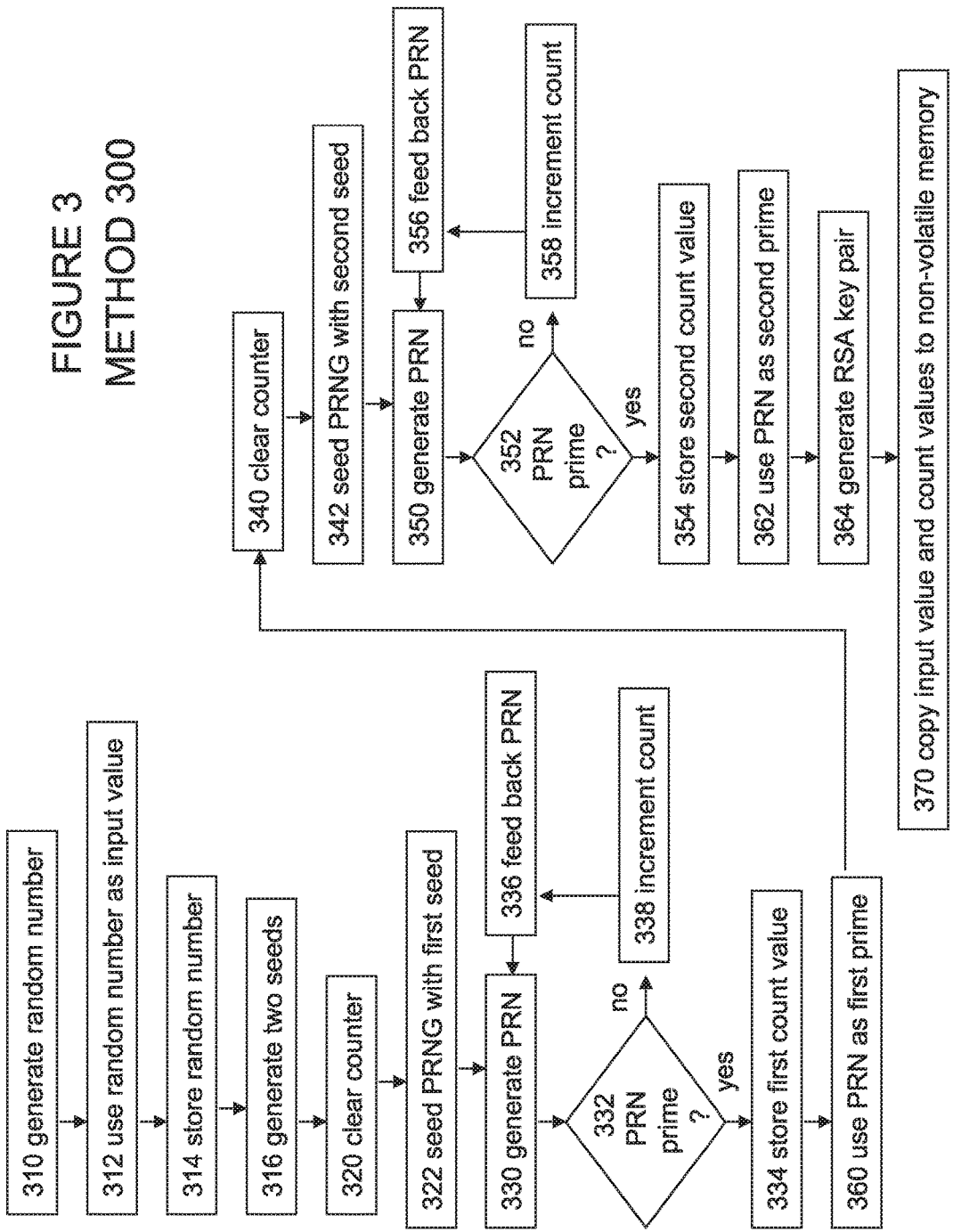
FIG. 3 illustrates a method to store an input value and a count value according to an embodiment of the present invention.

FIG. 2 illustrates key generation logic 200 according to an embodiment of the present invention. In one embodiment, key generation logic 200 in FIG. 2 corresponds to all or a portion of key generation logic 122 in FIG. 1, or a combination of all or a portion of key generation logic 122 and all or a portion of control logic 130. In one embodiment, key generation logic 200 is to generate an RSA key pair.

Key generation logic 200 may include seed generator 220, pseudo-random number generator 230, primality tester 240, counter 250, and key generator 260. Key generation logic 200 may be implemented in any combination of hardware, software, and firmware. For example, each of seed generator 220, pseudo-random number generator 230, primality tester 240, counter 250, and key generator 260 may be a hardware circuit, a software module, or any other hardware, software, or firmware structure.

Key generation logic 200 may receive an input value from true-random number generator 210, or from any other source. True-random number generator 210 may be any process or device that generates random numbers. However, the present invention is not limited in this respect, i.e., embodiments of the present invention do not require that the input value is a true random number. True-random number generator 210, or any other source of an input value for key generation logic 200, may be included in or separate from key generation logic 200. In one embodiment, the input value may be a 256-bit value.

Seed generator 220 is to generate seed values for pseudo-random number generator 230. Seed generator 220 may generate one or more seed values from a single input value, according to any deterministic approach. Seed generator 220 may use any approach, such as padding, to generate a total number of bits for seed values that is greater than the number of bits in the input value.

Pseudo-random number generator 230 is to generate a sequence of pseudo-random numbers using a seed value as an input value. The statistical distribution of output values of pseudo-random number generator 230 may approximate the statistical distribution of output values of a true-random number generator, such as true-random number generator 210. However, unlike true-random number generator 210, pseudo-random number generator 230 is deterministic. Given a particular input, pseudo-random number generator 230 always generates the same sequence of numbers. Pseudo-random number generator 230 may be implemented in a software algorithm, a hardware shift register, or according to any other approach.

Primality tester 240 is to determine whether numbers are prime. Given an input, primality tester 240 determines if it is a prime number, according to any approach. Counter 250 is to count the frequency of an event. Counter 250 may increment, decrement, or count according to any other approach. In one embodiment, counter 250 may be a 16-bit counter.

Key generator 260 is to generate one or more cryptographic keys. Key generator 260 may generate cryptographic keys according to any approach. In one embodiment, key generator 260 is to generate an RSA key pair.

In one embodiment, key generation logic 200 may be to generate one or more cryptographic keys from an input value, and to store the input value and one or more count values in non-volatile memory, according to the method embodiment of the invention illustrated in method 300 of FIG. 3.

In box 310 of FIG. 3, a random number is generated by true-random number generator 210. In box 312, the random number is used as the input value to key generation logic 200. In box 314, the random number is stored in a non-volatile memory. In box 316, seed generator 220 generates two seed values, a first and a second, based on the random number.

In box 320, counter 250 is cleared. In box 322, the first seed value from box 316 is used as an input to pseudo-random number generator (PRNG) 230.

In box 330, pseudo-random number generator 230 generates a pseudo-random number (PRN) based on its input value. In box 332, the pseudo-random number generated in box 330 is tested for primality by primality tester 240. If it is determined in box 332 that the pseudo-random number is prime, then that pseudo-random number is used as the first input to key generator 260 in box 360, and the count value from counter 250 is stored in non-volatile memory as the first count value in box 334. However, if it is determined in box 332 that the pseudo-random number is not prime, then that pseudo-random number (or a portion of it or a number derived from it) is fed back to the input of pseudo-random number generator 230 in box 336, counter 250 is incremented in box 338, and method 300 returns to box 330.

In box 340, counter 250 is cleared. In box 342, the second seed value from box 316 is used as an input to pseudo-random number generator 230.

In box 350, pseudo-random number generator 230 generates a pseudo-random number based on its input value. In box 352, the pseudo-random number generated in box 350 is tested for primality by primality tester 240. If it is determined in box 352 that the pseudo-random number is prime, then that pseudo-random number is used as the second input to key generator 260 in box 362, and the count value from counter 250 is stored in non-volatile memory in box 354. However, if it is determined in box 352 that the pseudo-random number is not prime, then that pseudo-random number (or a portion of it or a number derived from it) is fed back to the input of pseudo-random number generator 230 in box 356, counter 250 is incremented in box 358, and method 300 returns to box 350.

In box 360, the pseudo-random prime number from box 332 is used as the first input to key generator 260. In box 362, the pseudo-random prime number from box 352 is used as the second input to key generator 260. In box 364, key generator generates an RSA key pair using the first input as the first prime number and the second input as the second prime number.

In box 370, the non-volatile memory storing the input value and the first and second count values may be copied or transferred to another system, or a component for another system, such as a processor or a chipset. Therefore, the same RSA key pair generated from the input value in method 300 may be regenerated according to another embodiment of the present invention in another system. This same RSA key pair may then be repeatedly regenerated in this other system from the stored input value and the stored count values, so that the same RSA key pair may be re-used by a system without the need to persistently store the 2048 bits of information for an RSA key pair. Instead, in an embodiment with a 256-bit input value and two 16-bit count values, only 288 bits of information are persistently stored.

Within the scope of the present invention, method 300 may be performed in a different order, with illustrated boxes omitted, with additional boxes added, or with a combination of reordered, omitted, or additional boxes. As one example, boxes 360 to 364 may be omitted, because it may not be necessary or desired to generate or use the RSA key pair within the system in which the count values are created. As another example, boxes 314, 334, 354, and 374, representing the storing and/or copying of the random number and the count values to a non-volatile memory, may be combined, such that there is a single write to a single non-volatile memory.

Figure 4:
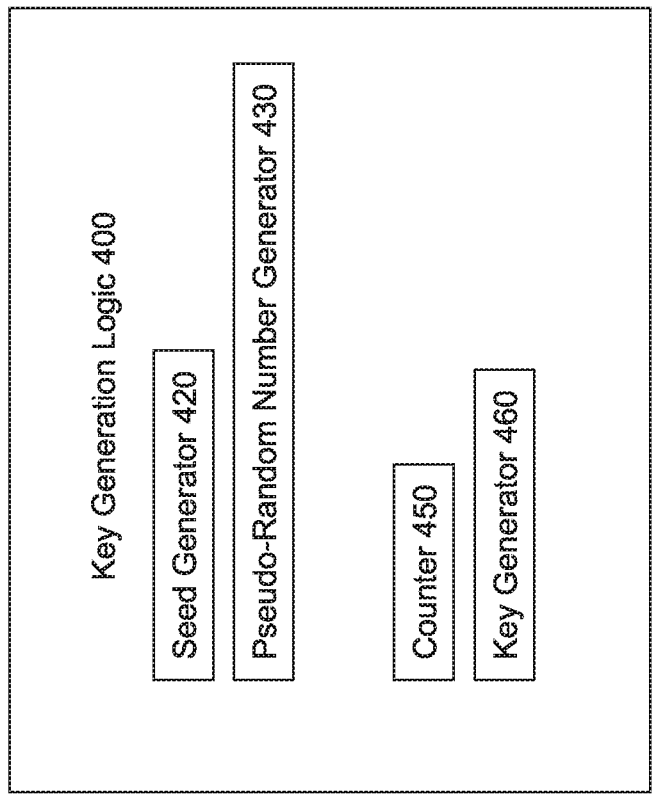
FIG. 4 illustrates logic to generate a cryptographic key according to an embodiment of the present invention

FIG. 4 illustrates key generation logic 400 according to another embodiment of the present invention. In one embodiment, key generation logic 400 in FIG. 4 corresponds to all or a portion of key generation logic 122 in FIG. 1, or a combination of all or a portion of key generation logic 122 and all or a portion of control logic 130. In one embodiment, key generation logic 400 is to generate an RSA key pair.

Key generation logic 400 may include seed generator 420, pseudo-random number generator 430, counter 450, and key generator 460. Key generation logic 400 may be implemented in any combination of hardware, software, and firmware. For example, each of seed generator 420, pseudo-random number generator 430, counter 450, and key generator 460 may be a hardware circuit, a software module, or any other hardware, software, or firmware structure.

Key generation logic 400 may fetch or receive an input value and a first and a second count value from a non-volatile memory. For example, in an embodiment in which key generation logic is within processor 100, key generation logic 400 may fetch or receive the input value and the count values from storage region 140. The input value and the count value may have been stored in the non-volatile memory according to another embodiment of the present invention, such as method 300 of FIG. 3. The input value may be a random number generated by a true-random number generator, but within the scope of the present invention, any random, pseudo-random, or non-random number from any source may be used as the input value.

Seed generator 420 is to generate seed values for pseudo-random number generator 430. Seed generator 420 may generate one or more seed values from a single input value, according to any deterministic approach. Seed generator 420 may use any approach, such as padding, to generate a total number of bits for seed values that is greater than the number of bits in the input value.

Pseudo-random number generator 430 is to generate a sequence of pseudo-random numbers using a seed value as an input value. The statistical distribution of output values of pseudo-random number generator 430 may approximate the statistical distribution of output values of a true-random number generator, such as true-random number generator 210. However, unlike true-random number generator 210, pseudo-random number generator 430 is deterministic. Given a particular input, pseudo-random number generator 430 always generates the same sequence of numbers. Pseudo-random number generator 430 may be implemented in a software algorithm, a hardware shift register, or according to any other approach.

Counter 450 is to count the frequency of an event. Counter 450 may increment, decrement, or count according to any other approach.

Key generator 460 is to generate one or more cryptographic keys. Key generator 460 may generate cryptographic keys according to any approach. In one embodiment, key generator 460 is to generate an RSA key pair.

Figure 5:
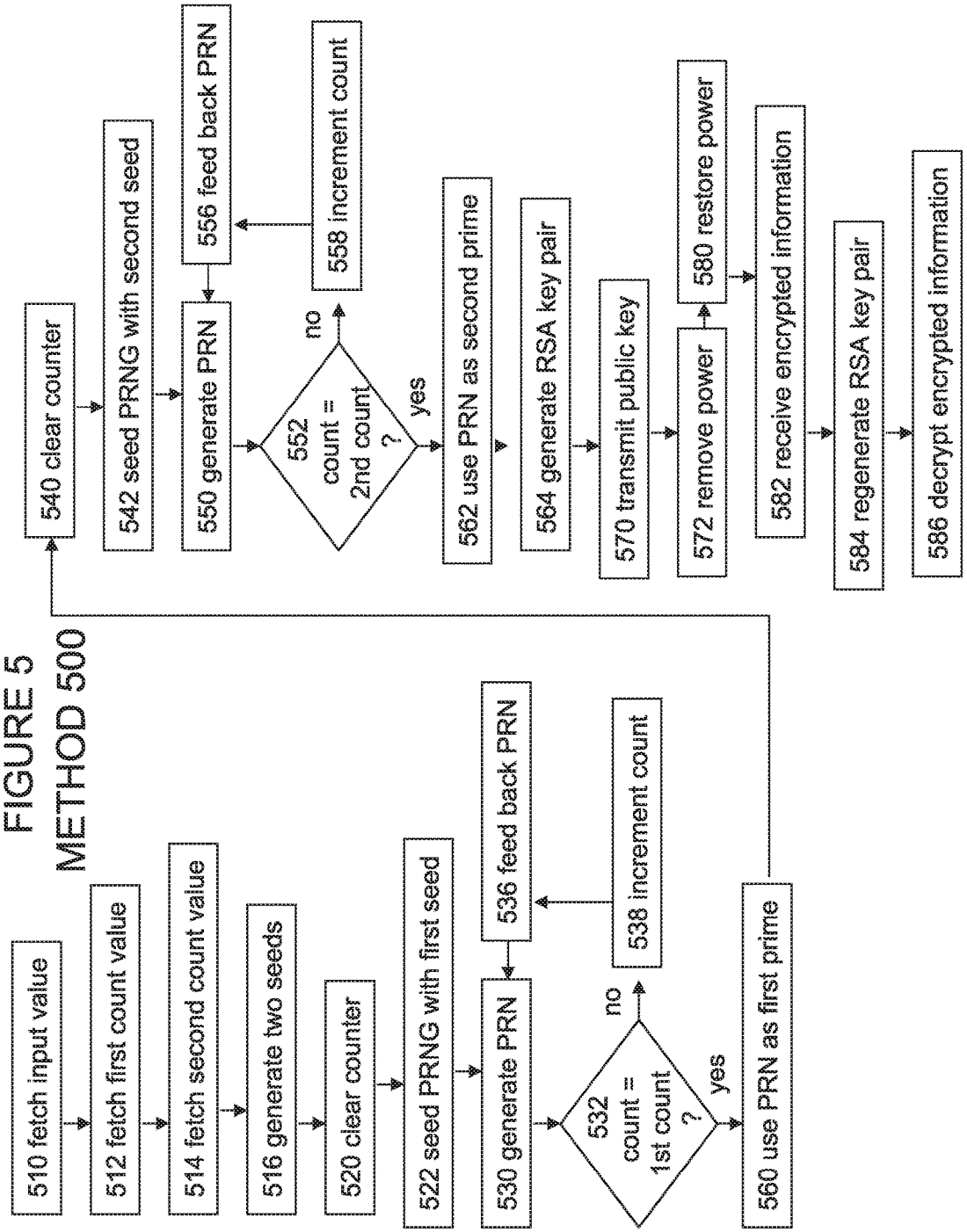
FIG. 5 illustrates a method to generate a cryptographic key according to an embodiment of the present invention.

In one embodiment, key generation logic 400 may be to generate one or more cryptographic keys from a stored input value and a first and a second stored count values, according to the method embodiment of the invention illustrated in method 500 of FIG. 5. In the embodiment of FIG. 5, the input value and count values may have been created and stored according to another embodiment of the present invention, such as method 300, where the seed generator, pseudo-random number generator, counter, and key generator use the same deterministic algorithm or design in both embodiments, so that the RSA keys generated by both embodiments for a given input value are the same. Furthermore, the number of times the output of the pseudo-random number generator must be fed back to the input of the pseudo-random number generator in order to generate a prime number based on a given seed value is the same in both embodiments. Therefore, the embodiment of FIG. 5 does not require primality testing, because the use of the stored count values with the stored input value will generate the same prime numbers that were generated by the embodiment of FIG. 3.

In box 510 of FIG. 5, an input value is fetched or received from a non-volatile memory. In box 512, a first count value is fetched or received from the non-volatile memory. In box 514, a second count value is fetched or received from the non-volatile memory. In box 516, seed generator 420 generates two seed values, a first and a second, based on the input value.

In box 520, counter 450 is cleared. In box 522, the first seed value from box 516 is used as an input to pseudo-random number generator 430.

In box 530, pseudo-random number generator 430 generates a pseudo-random number based on its input value. In box 532, the count of counter 450 is compared to the first count value. If it is determined in box 532 that the count of counter 450 is equal to the first count value, then the output of pseudo-random number generator 430 is used as the first input to key generator 460 in box 560. However, if it is determined that the count of counter 450 is not equal to the first count value, then the output of pseudo-random number generator 430 (or a portion of it or a number derived from it) is fed back to the input of pseudo-random number generator 430 in box 536, counter 450 is incremented in box 538, and method 500 returns to box 530.

In box 540, counter 450 is cleared. In box 542, the second seed value from box 516 is used as an input to pseudo-random number generator 430.

In box 550, pseudo-random number generator 430 generates a pseudo-random number based on its input value. In box 552, the count of counter 450 is compared to the second count value. If it is determined in box 552 that the count of counter 450 is equal to the second count value, then the output of pseudo-random number generator 430 is used as the second input to key generator 460 in box 562. However, if it is determined that the count of counter 450 is not equal to the second count value, then the output of pseudo-random number generator 430 (or a portion of it or a number derived from it) is fed back to the input of pseudo-random number generator 430 in box 556, counter 450 is incremented in box 558, and method 500 returns to box 550.

In box 560, the pseudo-random prime number from box 532 is used as the first input to key generator 460. In box 562, the pseudo-random prime number from box 552 is used as the second input to key generator 460. In box 564, key generator generates an RSA key pair using the first input as the first prime number and the second input as the second prime number.

In box 570, the public key of the RSA key pair generated in box 564 may be transmitted to another system. In box 572, power may be removed from the system in which method 500 is executed. Therefore, the RSA key pair generated in box 564 may be erased from volatile system memory.

In box 580, power may be restored to the system in which method 500 is executed. In box 582, information encrypted by the other system using the public key may be received by system 500. Then, in box 584, boxes 510 to 564 may then be repeated to regenerate the same RSA key pair generated in box 564. In box 586, the information encrypted by the other system using the public key may be decrypted using the private key.

Within the scope of the present invention, method 500 may be performed in a different order, with illustrated boxes omitted, with additional boxes added, or with a combination of reordered, omitted, or additional boxes. For example, boxes 510 to 514 may be combined into one operation or separately re-ordered within method 500, to fetch or receive the input value and the first and second count values together or separately at different times within method 500.

Figure 6:
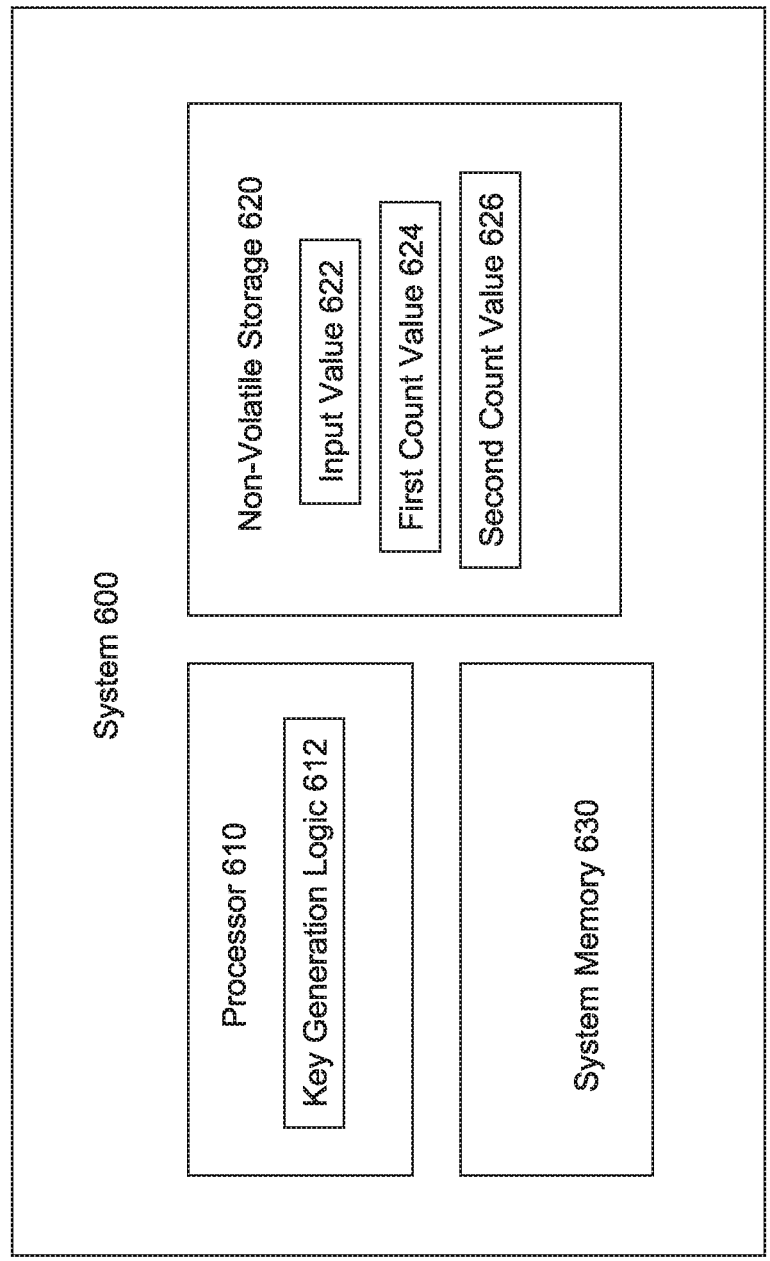
FIG. 6 illustrates a system to generate a cryptographic key according to an embodiment of the present invention.

FIG. 6 illustrates system 600 according to an embodiment of the present invention. System 600 includes processor 610, having key generation logic 612, which may include hardware designed to implement embodiments of the present invention as described above, and/or general purpose hardware to execute software and/or firmware embodying the present invention as described above. System 600 may also include non-volatile storage 620, storing or to store an input value in location 622, a first count value in location 624, and a second count value in location 626, each as described above. Non-volatile storage 620 may be any type of non-volatile storage readable by processor 610, and may be a separate memory component or may be storage within a component having another function, such as a chipset. System 600 may also include system memory 630, which may be static or dynamic random access memory, or any other type of medium readable by processor 610, or any combination of such mediums. Processor 610, non-volatile storage 620, and system memory 630 may be coupled to or communicate with each other within system 600 according to any approach, such as directly or indirectly through one or more buses, point-to-point, or other wired or wireless connections.

Embodiments or portions of embodiments of the present invention, as described above, may be stored in any form of a machine-readable medium. For example, all or part of methods 300 and/or 500 may be embodied in software or firmware instructions that are stored on a medium readable by processor 100 and/or processor 610, which when executed by processor 100 and/or processor 610, cause processor 100 and/or processor 610 to execute an embodiment of the present invention.

Thus, embodiments of an invention for cryptographic key generation using a stored input value and a stored count value have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An article of manufacture comprising at least one non-transitory machine-readable medium having stored thereon instructions, which if executed by a machine cause the machine to:
   determine at least one seed value;
   generate a first pseudo-random number using a pseudo-random number generator of a processor using the at least one seed value as an input;
   update a counter of the processor;
   in response to the first pseudo-random number not being prime, iteratively test the first pseudo-random number for primality in a primality tester of the processor, generate the first pseudo-random number in the pseudo-random number generator, and update the counter until a first prime number is obtained;
   store the first prime number and a first value of the counter;
   generate a second pseudo-random number using the pseudo-random number generator using the at least one seed value as an input;
   update the counter;

in response to the second pseudo-random number not being prime, iteratively test the second pseudo-random number for primality in the primality tester, generate the second pseudo-random number in the pseudo-random number generator, and update the counter until a second prime number is obtained;

store the second prime number and a second value of the counter; and generate at least a portion of a RSA key pair in a key generation circuit of the processor using the first and second prime numbers, wherein the processor is to encrypt a value using the at least the portion of the RSA key pair and to transmit a public key of the at least the portion of the RSA key pair to a second machine to cause the second machine to encrypt information using the public key of the at least the portion of the RSA key pair.

2. The article of claim 1, further comprising instructions, which if executed by the machine cause the machine to store the first value of the counter in a non-volatile memory.

3. The article of claim 1, wherein the instructions to determine the at least one seed value comprise instructions, which if executed by the machine cause the machine to generate a first seed value and a second seed value from an input value.

4. The article of claim 3, further comprising instructions, which if executed by the machine cause the machine to generate a random number comprising the input value.

5. The article of claim 3, wherein to iteratively generate the first pseudo-random number comprises to feed an output of the pseudo-random number generator back to an input of the pseudo-random number generator a number of times.

6. The article of claim 5, further comprising instructions, which if executed by the machine cause the machine to feed the output of the pseudo-random number generator back to the input of the pseudo-random number generator until the output is a prime number.

7. The article of claim 3, further comprising instructions, which if executed by the machine cause the machine to send the input value, the first seed value and the second seed value to a second system.

8. The article of claim 7, further comprising instructions, which if executed by the machine cause the machine to send the input value, the first seed value and the second seed value to enable the second system to re-generate the RSA key pair.

9. A processor comprising:
hardware non-volatile storage to store a first count value and a second count value; and
a hardware key generation circuit to:
determine at least one seed value;
generate a first pseudo-random number using a pseudo-random number generator using the at least one seed value as an input;
update a hardware counter;
in response to the first pseudo-random number not being prime, iteratively test the first pseudo-random number for primality in a primality tester, generate the first pseudo-random number in the pseudo-random number generator, and update the hardware counter until a first prime number is obtained;
store the first count value in the hardware non-volatile storage;
generate a second pseudo-random number using the pseudo-random number generator using the at least one seed value as an input;
update the hardware counter;
in response to the second pseudo-random number not being prime, iteratively test the second pseudo-random number for primality in a primality tester, generate the second pseudo-random number in the pseudo-random number generator, and update the hardware counter until a second prime number is obtained;
store the second count value in the hardware non-volatile storage; and
generate at least a portion of a cryptographic key pair in the hardware key generation circuit using the first and second prime numbers, wherein the processor is to encrypt a value using the at least the portion of the cryptographic key pair and to transmit a public key of the at least the portion of cryptographic key pair to a second computer system coupled to a first computer system to cause the second computer system to encrypt information using the public key of the at least the portion of cryptographic key pair, the first computer system including the processor.

10. The processor of claim 9, wherein the processor comprises an instruction logic having circuitry to receive and decode instructions.

11. The processor of claim 9, wherein the processor comprises an execution logic having circuitry to execute instructions.

12. The processor of claim 11, wherein the execution logic comprises the hardware key generation circuit.

13. The processor of claim 9, wherein the hardware key generation circuit comprises a seed generator to generate the at least one seed value.

14. The processor of claim 9, wherein the hardware key generation circuit comprises the primality tester to test for the first prime number.

15. The processor of claim 9, wherein the hardware key generation circuit comprises the hardware counter.

16. The processor of claim 9, wherein the hardware key generation circuit is to re-generate the cryptographic key pair based at least in part on the first count value and the second count value, the cryptographic key pair not persistently stored in the processor.

17. A system comprising:
a processor comprising a hardware key generation circuit to:
determine at least one seed value;
generate a first pseudo-random number using a pseudo-random number generator using the at least one seed value as an input;
update a hardware counter;
in response to the first pseudo-random number not being prime, iteratively test the first pseudo-random number for primality in a primality tester, generate the first pseudo-random number in the pseudo-random number generator, and update the hardware counter until a first prime number is obtained;
store a first count value from the hardware counter;
generate a second pseudo-random number using the pseudo-random number generator using the at least one seed value as an input;
update the hardware counter;
in response to the second pseudo-random number not being prime, iteratively test the second pseudo-random number for primality in the primality tester, generate the second pseudo-random number in the pseudo-random number generator, and update the hardware counter until a second prime number is obtained;

store a second count value from the hardware counter; and generate at least a portion of a cryptographic key pair in the hardware key generation circuit using the first and second prime numbers, wherein the processor is to encrypt a value using the at least the portion of the cryptographic key pair and to transmit a public key of the at least the portion of the cryptographic key pair to a second system to cause the second system to encrypt information using the public key of the at least the portion of the cryptographic key pair;

a non-volatile storage to store the first count value and the second count value; and a system memory coupled to the processor.

18. The system of claim 17, wherein the hardware key generation circuit is to generate a first seed value and a second seed value from an input value, and iteratively generate the first pseudo-random number by feedback of an output of the pseudo-random number generator to an input of the pseudo-random number generator a number of times.

19. The system of claim 18, wherein the processor is to send the input value, the first seed value and the second seed value to the second system to enable the second system to re-generate the cryptographic key pair.

20. The system of claim 17, wherein the hardware key generation circuit is to re-generate the cryptographic key pair based at least in part on the first count value and the second count value, the cryptographic key pair not persistently stored in the processor.

\* \* \* \* \*